(12) United States Patent
Castellucci et al.

(10) Patent No.: US 9,470,540 B1
(45) Date of Patent: Oct. 18, 2016

(54) IDENTIFYING A PARKING LOCATION WITH RESPECT TO A DESTINATION

(71) Applicant: International Business Machines Corporation, Armonk, NY (US)

(72) Inventors: Antonio Castellucci, Rome (IT); Roberto Guarda, Pomezia (IT)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 14/691,676

(22) Filed: Apr. 21, 2015

(51) Int. Cl.
*G01C 21/36* (2006.01)

(52) U.S. Cl.
CPC .................. *G01C 21/3605* (2013.01)

(58) Field of Classification Search
CPC  G01C 21/34; G01C 21/343; G01C 21/3453; G01C 21/3461; G01C 21/3605; G01C 21/3679; G01C 21/3682; G01C 21/3685; G01C 21/00; G01C 21/20; G01C 21/3446; G01C 21/3476; G01C 21/3484; G01C 21/2623; G01C 21/2641; G01C 21/3407

See application file for complete search history.

(56) References Cited

U.S. PATENT DOCUMENTS

| 7,257,484 | B2 | 8/2007 | Park |
| 8,423,275 | B1* | 4/2013 | Kandal ........................ G08G 1/14 340/853.1 |
| 2009/0171566 | A1* | 7/2009 | Morimoto .......... G01C 21/3453 701/465 |
| 2012/0161986 | A1* | 6/2012 | Amir .................. G01C 21/3685 340/932.2 |
| 2014/0266800 | A1 | 9/2014 | Koukoumidis et al. |

FOREIGN PATENT DOCUMENTS

| EP | 1611416 B1 | 5/2007 |
| WO | 2014117016 A1 | 7/2014 |

* cited by examiner

*Primary Examiner* — Jerrah Edwards
*Assistant Examiner* — Adam Mott
(74) *Attorney, Agent, or Firm* — Christopher McLane; Daniel R. Simek

(57) ABSTRACT

In an approach for locating parking, a computer identifies driving directions to a destination. The computer receives a navigation input from a user to locate parking associated with the destination. The computer calculates one or more navigation paths based on the destination, wherein the one or more navigation paths include one or more street segments that connect identical starting and ending points with at least one different street segment and overall values indicating priority based on one or more weight factors associated with the one or more street segments. The computer selects a first navigation path from the calculated one or more navigation paths utilizing an ordered ranking of the one or more navigation paths. The computer provides driving directions associated with the first navigation path. The computer determines whether the user locates parking while utilizing the first navigation path.

17 Claims, 5 Drawing Sheets

IDENTIFYING A PARKING LOCATION WITH RESPECT TO A DESTINATION

BACKGROUND OF THE INVENTION

The present invention relates generally to the field of navigation systems, and more particularly to locating parking with respect to a destination.

Through technological advancements, the preferred manner in which individuals navigate to a destination has evolved. Initially individuals navigated to a destination by following routes by viewing a map (e.g., paper map or road atlas an individual interpreted to reach a destination), or by utilizing computer mapping programs (e.g., customized route to a destination that includes a tailored map with step by step printed instructions). However, with the development of global positioning systems (GPS) and portable navigation systems, individuals are able to receive electronic maps with turn-by-turn guidance enhanced with voice instructions that update and occur real time until reaching the destination. Navigation systems may be embedded or portable, and combine positioning capabilities (e.g., GPS) and navigation function in order to monitor and control the movement of a vehicle from one location to another. Navigation systems are capable of including maps for display, determining a vehicle's location via sensors, maps, or information from external sources, providing suggested driving directions to a user of a vehicle via text or speech, providing information on nearby vehicles, hazards or obstacles, providing information on traffic conditions, and suggesting alternative driving directions.

Navigation systems receive signals from satellites through a GPS antenna and identify the position and direction of the vehicle by combining the data from the satellites with information received from various onboard sensors (e.g., direction sensor, speed sensor, etc.). By accessing the map database, the navigation system displays the current position and direction of the vehicle on a visual output device (e.g., handheld, embedded console screen, etc.) by comparing the information in the GPS antenna and onboard sensors to the information in the map database. In order to reach a destination, a user initially enters data (e.g., address, point of interest, etc.) pertaining to the destination into the navigation system. Based on the current location, configurations and locations of nearby streets, connecting routes between streets, as well as attributes, such as one-way streets and intersections, are ascertained from the map database. After confirming the current location and the vicinity of the destination, the actual destination is located. The navigation system confirms and determines the route that connects those two locations and street connection status (e.g., intersections, left/right turn conditions, traffic conditions, street speeds, etc.). The navigation system may determine multiple possible routes from the current location to the destination but suggests an optimum route (e.g., fastest travel time, shortest distance, etc.). After the user confirms the route, the navigation system provides driving directions and displays the route. While driving directions continue, the navigation system also updates information on the display providing a real-time view of the map and the route on which the vehicle is driving.

SUMMARY

Aspects of the present invention disclose a method, computer program product, and system for locating parking. The method includes one or more processors identifying driving directions to a destination. The method further includes one or more computer processors receiving a navigation input from a user to locate parking associated with the destination. The method further includes one or more computer processors calculating one or more navigation paths based on the destination, wherein the one or more navigation paths include one or more street segments that connect identical starting and ending points with at least one different street segment and overall values indicating priority based on one or more weight factors associated with the one or more street segments. The method further includes one or more computer processors determining an ordered ranking of the one or more navigation paths based on the overall values of the one or more navigation paths. The method further includes one or more computer processors selecting a first navigation path from the calculated one or more navigation paths utilizing the ordered ranking of the one or more navigation paths. The method further includes one or more computer processors providing driving directions associated with the first navigation path. The method further includes one or more computer processors determining whether the user locates parking while utilizing the first navigation path.

DETAILED DESCRIPTION

Navigation systems may be used to determine an optimum route to a destination and to then provide real time driving directions and updates to the route to a user while driving until reaching the destination. As recognized by embodiments of the present invention, once a user reaches and/or passes the destination, the navigation system may recalculate another route and return the user to the destination instead of aiding the user to locate parking. Embodiments of this invention determine and select an optimum circular path around the destination for the user to follow that assists in locating parking. Additionally, embodiments of the invention allow for the user to incorporate street parking information into the navigation system regarding parking conditions in order to further aid in the selection of an optimum circular path that may be more likely to result in successfully locating parking.

Figure 1:
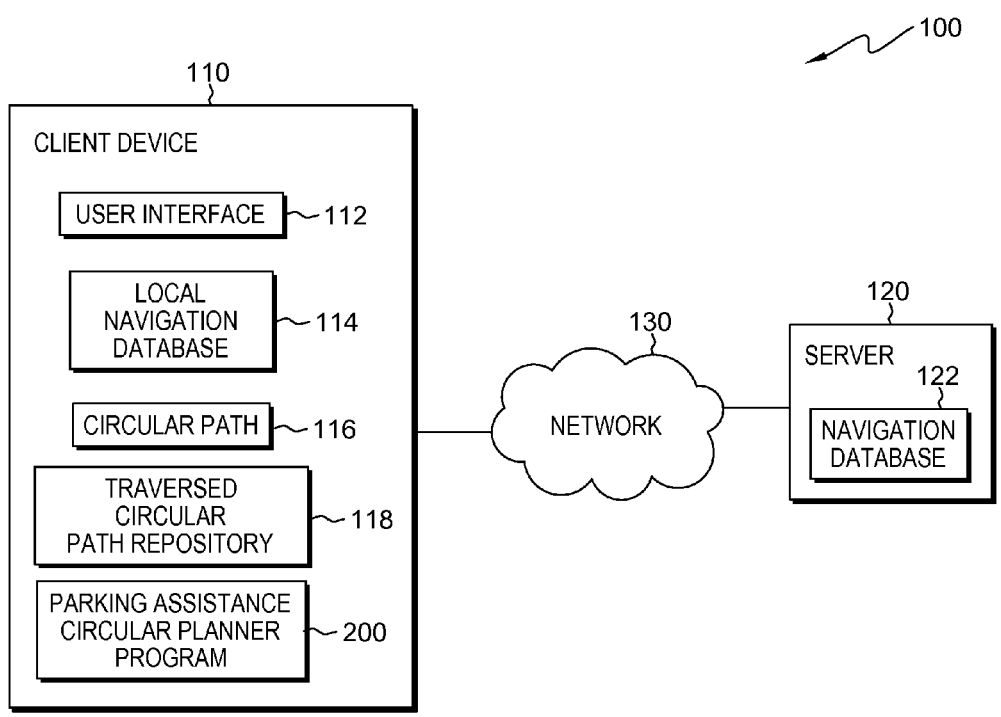
FIG. 1 is a functional block diagram illustrating a navigation system environment, in accordance with an embodiment of the present invention.

The present invention will now be described in detail with reference to the Figures. FIG. 1 is a functional block diagram illustrating a navigation system environment, generally designated 100, in accordance with one embodiment of the present invention. FIG. 1 provides only an illustration of one embodiment and does not imply any limitations with regard to the environments in which different embodiments may be implemented.

In the depicted embodiment, navigation system environment 100 includes client device 110 and server 120 interconnected over network 130. In another embodiment, navigation system environment 100 may only include client device 110. In some other embodiment, navigation system environment 100 may include additional computing devices, mobile computing devices, servers, computers, storage devices, or other devices not shown.

Client device 110 may be any electronic device or computing system capable of processing program instructions and receiving and sending data. In some embodiments, client device 110 may be a laptop computer, a tablet computer, a netbook computer, a personal computer (PC), a desktop computer, a personal digital assistant (PDA), a smart phone, or any programmable electronic device capable of communicating with network 130. In general, client device 110 is representative of any electronic device or combination of electronic devices capable of executing machine readable program instructions as described in greater detail with regard to FIG. 4, in accordance with embodiments of the present invention. Client device 110 contains user interface 112, local navigation database 114, circular path 116, traversed circular path repository 118, and parking assistance circular planner program 200.

User interface 112 is a program that provides an interface between a user of client device 110 and a plurality of applications that reside on client device 110 (e.g., parking assistance circular planner program 200) and/or may be accessed over network 130. A user interface, such as user interface 112, refers to the information (e.g., graphic, text, sound) that a program presents to a user, and the control sequences the user employs to control the program. A variety of types of user interfaces exist. In one embodiment, user interface 112 is a graphical user interface. A graphical user interface (GUI) is a type of interface that allows users to interact with peripheral devices (i.e., external computer hardware that provides input and output for a computing device, such as a keyboard and mouse) through graphical icons and visual indicators as opposed to text-based interfaces, typed command labels, or text navigation. The actions in GUIs are often performed through direct manipulation of the graphical elements. User interface 112 sends and receives information (e.g., street parking information, navigation driving directions, etc.) to and from parking assistance circular planner program 200.

Local navigation database 114 and navigation database 122 are databases that include the information a navigation system (e.g., parking assistance circular planner program 200) utilizes to determine circular paths (e.g., routes, interconnecting streets such as circular path 116) to reach a destination and to locate parking. Local navigation database 114 and navigation database 122 may include multiple databases, such as street network data (e.g., street configuration, connection conditions, attributes, etc.), background data (e.g., rivers, railroads, shores, etc.), site information (e.g., building names, addresses, structures, etc.), and voice data (e.g., voice guidance). In one embodiment, local navigation database 114 and navigation database 122 are the same version (e.g., both include the most current navigation information). In some other embodiment, local navigation database 114 and navigation database 122 are not the same version (e.g., local navigation database 114 is a down-level version of navigation database 122). In the depicted embodiment, local navigation database 114 is a locally stored copy of navigation database 122 that resides on client device 110 for utilization. In the depicted embodiment, navigation database 122 is the version of the navigation system database from the navigation system provider that resides on server 120, which may be downloadable by client device 110. In some other embodiment, local navigation database 114 and navigation database 122 may reside on server 120 or client device 110 or on another server or computing device (not shown) connected over network 130 provided at least local navigation database 114 is accessible by parking assistance circular planner program 200 and local navigation database 114 may access navigation database 122.

Circular path 116 encompasses the driving directions and visuals aids (e.g., maps) associated with a preferred and/or selected driving route around the destination, which assists the user to locate parking (e.g., series of connected streets that start with and return to the destination, starting and ending points are the same). Circular path 116 is the output of parking assistance circular planner program 200 with weighting rules applied to the individual street segments that form circular path 116 that results in an optimum driving route (e.g., optimum driving route with respect to the weights of the individual street segments). In one embodiment, circular path 116 may change with each subsequent pass by the original destination (i.e., when the user reaches the end of the current circular path 116). In another embodiment, circular path 116 may change after a user enters street parking information through user interface 112. In the depicted embodiment, circular path 116 resides on client device 110. In another embodiment, circular path 116 may reside on server 120. In some other embodiment, circular path 116 may reside on another server or computing device (not shown) connected over network 130, provided circular path 116 is accessible by parking assistance circular planner program 200.

Traversed circular path repository 118 is a collection of previous iterations of circular path 116 already traversed that did not result in locating parking. Traversed circular path repository 118 stores the driving directions (e.g., streets, turns, etc.) associated with previous iterations of circular path 116 for future use in order to aid parking assistance circular planner program 200 in selecting a new iteration of circular path 116 (e.g., limits the probability of repeating the same iteration of circular path 116 when other untraversed options are available). In the depicted embodiment, traversed circular path repository 118 resides on client device 110. In another embodiment, traversed circular path repository 118 may reside on server 120. In some other embodiment, traversed circular path repository 118 may reside on another server or computing device (not shown) connected over network 130 provided traversed circular path repository 118 is accessible by parking assistance circular planner program 200.

Server 120 may be a management server, a web server, or any other electronic device or computing system capable of receiving and sending data. In some embodiments, server 120 may be a laptop computer, a tablet computer, a netbook computer, a personal computer (PC), a desktop computer, a personal digital assistant (PDA), a smart phone, or any programmable device capable of communication with client device 110 over network 130. In other embodiments, server 120 may represent a server computing system utilizing multiple computers as a server system, such as in a cloud computing environment. Server 120 contains navigation database 122.

Network 130 may be a local area network (LAN), a wide area network (WAN), such as the Internet, a wireless local area network (WLAN), any combination thereof, or any combination of connections and protocols that will support communications between client device 110, server 120, and other computing devices and servers (not shown), in accordance with embodiments of the inventions. Network 130 may include wired, wireless, or fiber optic connections.

Parking assistance circular planner program 200 is a navigation system program and/or navigation system enhancement that assists the user in locating parking around a selected destination by providing text and/or vocalized driving directions utilizing interconnecting streets that form a loop around the destination referred to as circular path 116. Parking assistance circular planner program 200 utilizes weight factors, weighting rules, user input, and traversed circular path repository 118 in conjunction with existing navigation route planning algorithms to create multiple variations of circular paths. Parking assistance circular planner program 200 then selects an initial best circular path for the user to traverse (e.g., shortest mileage, shortest travel time, highest probability of locating parking, etc.). In the depicted embodiment, parking assistance circular planner program 200 resides on client device 110. In another embodiment, parking assistance circular planner program 200 may reside on server 120. In some other embodiment, parking assistance circular planner program 200 may reside on another server or computing device (not shown) connected over network 130 provided parking assistance circular planner program 200 has access to local navigation database 114, circular path 116, and traversed circular path repository 118.

Figure 2:
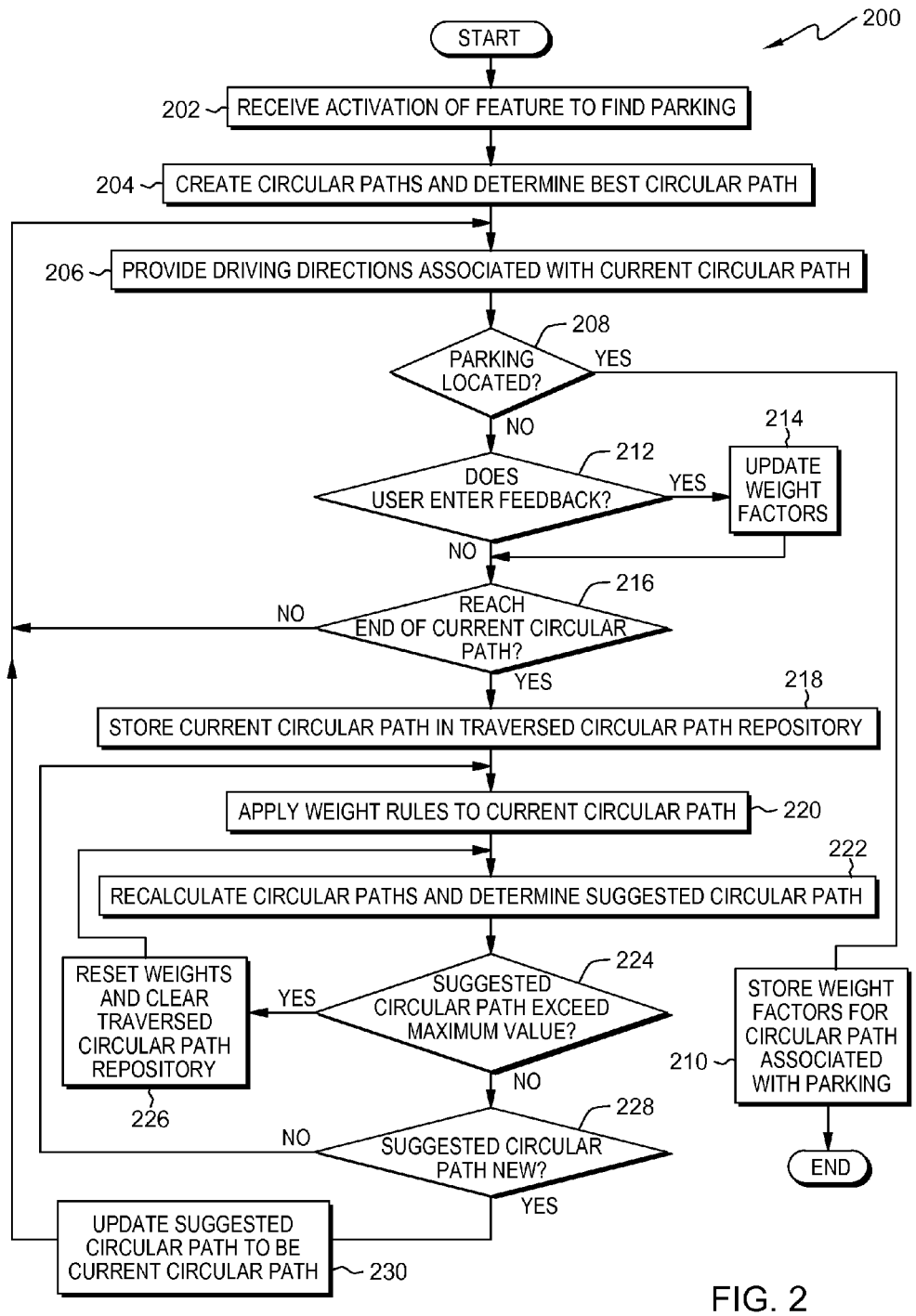
FIG. 2 is a flowchart depicting operational steps of a parking assistance circular planner program, inserted on a client device within the navigation system environment of FIG. 1, a program for assisting in locating parking within the vicinity of a destination, in accordance with an embodiment of the present invention.

FIG. 2 is a flowchart depicting operational steps of parking assistance circular planner program 200, a program for assisting in locating parking within the vicinity of a destination, in accordance with an embodiment of the present invention. Prior to utilizing parking assistance circular planner program 200, the user of client device 110, through user interface 112, enters initial information regarding at least a start and destination for which the navigation system incorporating parking assistance circular planner program 200 utilizes to plan a route. The user, through user interface 112, then initiates navigation to the destination (e.g., receives driving directions to reach the destination).

In step 202, parking assistance circular planner program 200 receives activation of the feature to find parking. In a preferred embodiment, parking assistance circular planner program 200 receives activation of the feature to find parking once the user reaches the destination (e.g., user visually identifies the destination, no further driving instructions are available, etc.). In one embodiment, parking assistance circular planner program 200 activates in response to the user of client device 110 through user interface 112 depressing a physical and/or virtual button (e.g., hardwired through electrical circuitry and software, virtual touchscreen symbol, menu selection, etc.) that links to an option to activate a find parking option. In another embodiment, parking assistance circular planner program 200 activates in response to a vocal command from the user through a microphone of client device 110. In some other embodiment, parking assistance circular planner program 200 activates when parking assistance circular planner program 200 determines client device 110, via the GPS, is within a predetermined vicinity of the destination (e.g., set distance, last direction step, one street prior to destination, etc.). For example, when the user creates the initial request for navigation to a destination, the user also selects an option to activate the find parking mode when within a two-tenths of a mile of the destination.

In step 204, parking assistance circular planner program 200 creates circular paths and determines the initial best circular path (e.g., circular path 116). In one embodiment, parking assistance circular planner program 200 calculates route information (e.g., time, distance, etc.) associated with individual segments (e.g., encompasses driving directions, time, distance, associated with individual steps) utilizing existing navigation system route planning algorithms and local navigation database 114. In another embodiment, parking assistance circular planner program 200 incorporates information from a traffic monitoring system into the existing navigation algorithms that may alter the ordered ranking of the circular paths.

In some other embodiment, parking assistance circular planner program 200 may apply weight factors from a previous successful version of circular path 116 (e.g., parking was located before) and may alter the ordered ranking of the circular paths. Weight factors include promotions (e.g., standard promotion, strong promotion) to reduce and/or modify the weight factor and penalizations (e.g., standard penalizations, strong penalizations) to increase and/or modify the weight factor. Standard promotions and penalizations (e.g., defaults without supporting data) are of a lesser magnitude (e.g., reduced predefined percentage, predefined overall reduction) than strong promotions and penalizations (e.g., default with supporting data, increased predefined percentage, predefined overall increase). Parking assistance circular planner program 200, via the GPS navigation software, identifies the start and destination associated with circular path 116. Parking assistance circular planner program 200 then searches traversed circular path repository 118 for a successful circular path associated with the destination (e.g., available parking location was found previously along a circular path and stored) and retrieves weight factors. Parking assistance circular planner program 200 then incorporates the associated weight factors into the existing navigation algorithms, which may alter the ordered ranking of the circular paths (e.g., circular path 116 where parking was located previously may become the highest rank).

Figure 3A:
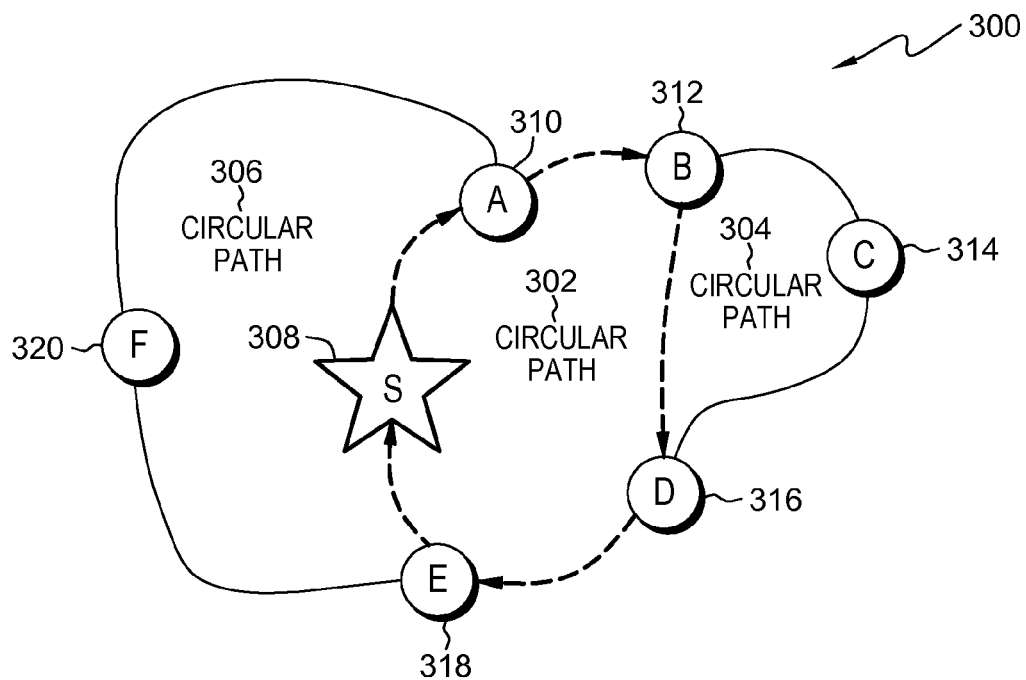
FIG. 3A depicts an example of a navigation device, displaying an optimum circular path to locate parking, in accordance with an embodiment of the present invention.
Figure 3B:
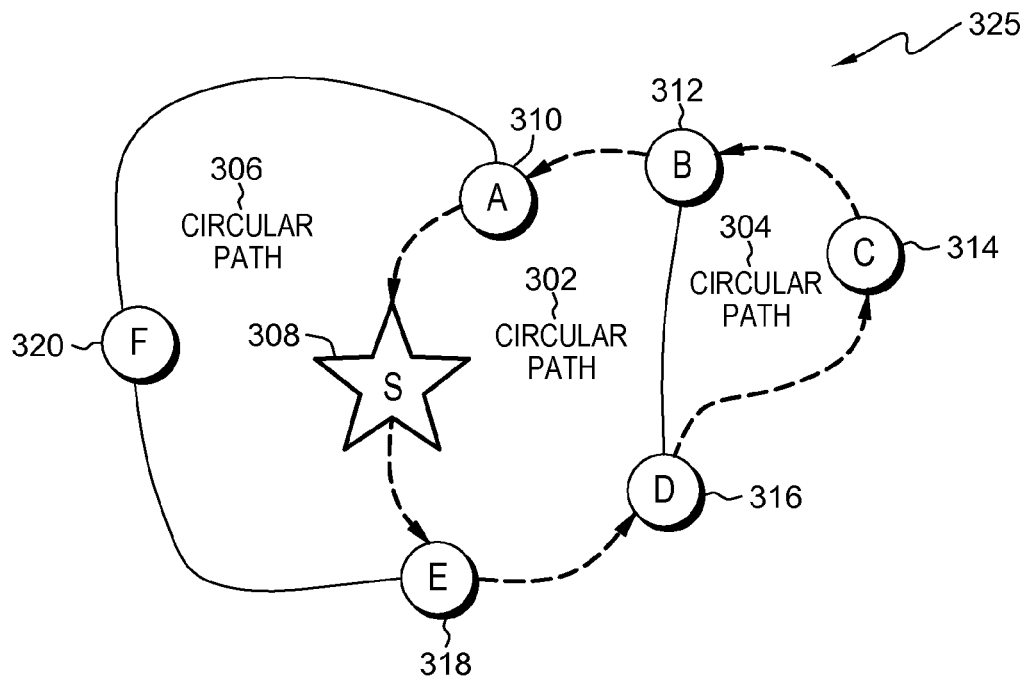
FIG. 3B depicts an example of a navigation device, displaying a second circular path to locate parking after application of promotions and penalizations to the optimum circular path, in accordance with an embodiment of the present invention.
Figure 3C:
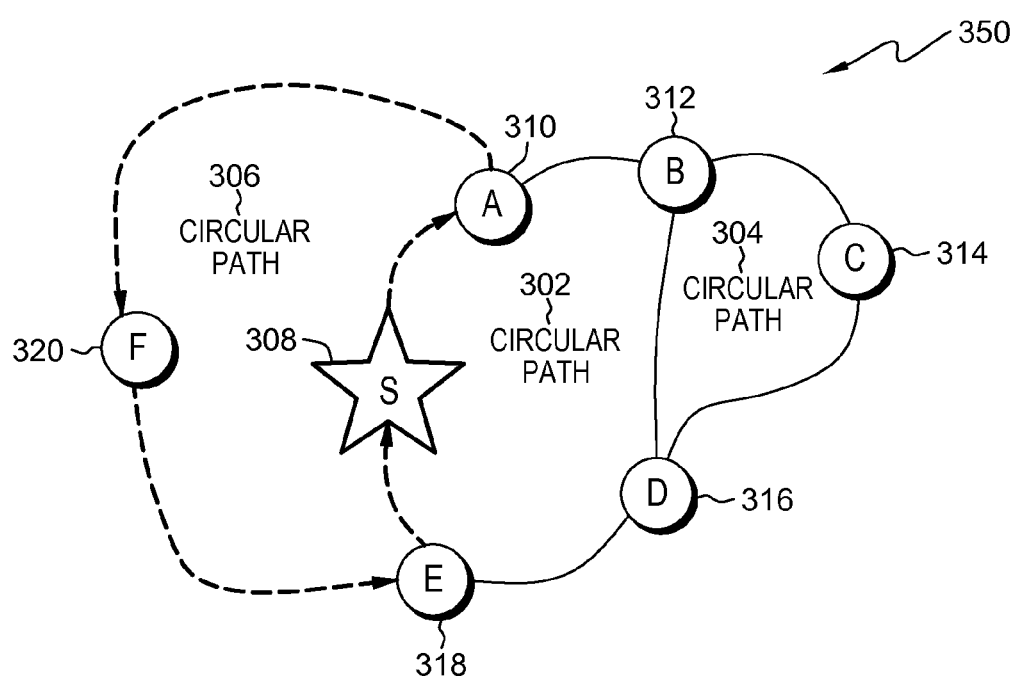
FIG. 3C depicts an example of a navigation device, displaying a third circular path to locate parking after application of additional penalizations to the circular paths, in accordance with an embodiment of the present invention.

Parking assistance circular planner program 200 then compiles the individual segments and creates one or more circular paths that include associated overall route values (e.g., total time to destination and total distance). For example, FIG. 3A depicts potential circular paths 300 (e.g., circular path 302 selected), FIG. 3B depicts potential circular paths 325 (e.g., circular path 304 selected), and FIG. 3C depicts potential circular paths 350 (e.g., circular path 306 selected). Parking assistance circular planner program 200 depicts the destination as destination S 308 (e.g., star symbol, thumb tack, conversation bubble, etc.), and the intersection of the streets as symbols A 310, B 312, C 314, D 316, E 318, and F 320 (e.g., circles, triangles, etc.). Parking assistance circular planner program 200 then creates three circular paths, circular path 302, circular path 304, and circular path 306 that result in complete loops (ordered ranking from highest to lowest priority). Parking assistance circular planner program 200 depicts circular path 302 as a series of interconnecting lines (e.g., connects individual segments) going from destination S 308 to A 310 to B 312 to D 316 to E 318 and then returns to destination S 308. Parking assistance circular planner program 200 depicts circular path 304 as a series of interconnecting lines going from destination S 308 to E 318 to D 316 to C 314 to B 312 to A 310 and then returns to destination S 308. Parking assistance circular planner program 200 depicts circular path 306 as a series of interconnecting lines going from destination S 308 to A 310 to F 320 to E 318 and then returns to destination S 308.

Parking assistance circular planner program 200 determines an ordered ranking of the potential circular paths from the existing navigation system route planning algorithms and user inputs. Parking assistance circular planner program 200 then determines the best circular path 116 from the available circular paths. In one embodiment, parking assistance circular planner program 200 automatically selects the best circular path 116 to be the first entry within the ordered ranking. In another embodiment, parking assistance circular planner program 200 receives a selection of the best circular path 116 from the user through user interface 112 (e.g., user may select a different circular path 116 than the highest ranked from the ordered ranking). As depicted in example FIG. 3A, parking assistance circular planner program 200 automatically selects circular path 302 to be circular path 116 (e.g., depicted by the dashed lines in FIG. 3A) representing the shortest travel time relative to reaching destination S 308 of the three available circular paths.

In step 206, parking assistance circular planner program 200 provides driving directions associated with current circular path (e.g., voice commands and/or animated visual display). For example, in FIG. 3A, parking assistance circular planner program 200 provides driving directions corresponding to the visual output as identified by the arrows and dashed lines for circular path 302 on client device 110. Parking assistance circular planner program 200 continues to provide driving directions associated with the current circular path 116 until the user enters input through user interface 112 indicating driving directions are no longer necessary (e.g., user locates parking, user exits navigation and/or find parking mode, etc.).

In decision 208, parking assistance circular planner program 200 determines whether the user locates parking. Parking assistance circular planner program 200 monitors client device 110 for receipt of user inputs through user interface 112. After receipt of a user input, parking assistance circular planner program 200 processes the user input based on type (e.g., parked, street parking information, new route, cancel, etc.), and performs associated tasks. In one embodiment, parking assistance circular planner program 200 receives user input through user interface 112 in response to a physical interaction with client device 110 (e.g., hardwired button, virtual button and/or symbol on a screen, combination of a bezel button with virtual text) confirming that parking has been located. In some other embodiment, parking assistance circular planner program 200 receives a voice command (e.g., user vocalizes a predetermined phrase of "parking located," "vehicle parked," etc.) through the microphone of client device 110. In another embodiment, parking assistance circular planner program 200 may determine the user locates parking when client device 110 is placed in park (e.g., embedded navigation system within a vehicle receives input from sensors and/or the computer of the vehicle). In some other embodiment, parking assistance circular planner program 200 may register the user located parking when client device 110 is turned off (e.g., system automatically stores last known position). In yet some other embodiment, parking assistance circular planner program 200 may not receive input regarding parking (e.g., receives no input, receives other input not related to parking).

If parking assistance circular planner program 200 determines the user locates parking (decision 208, yes branch), then parking assistance circular planner program 200 stores the weight factors for the current circular path 116 associated with parking (step 210). If parking assistance circular planner program 200 determines the user does not locate parking (decision 208, no branch), then parking assistance circular planner program 200 determines whether the user enters street parking information (decision 212).

In step 210, parking assistance circular planner program 200 stores the weight factors for the current circular path associated with parking in local navigation database 114 and/or traversed circular path repository 118. In some embodiments, parking assistance circular planner program 200 may also store the weight factors for the current circular path 116 associated with parking within navigation database 122 (e.g., uploads information). Parking assistance circular planner program 200 applies a promotion to the weight factors associated with the individual segments of circular path 116 associated with finding parking (e.g., reduces original weight factors, incorporates additional reductions to previous promotions and penalizations). Parking assistance circular planner program 200 stores the successful iteration of circular path 116 and associated weight factors for future use.

For example, the user works in a metropolitan area with limited parking but discovers a remote street with a high number of available free parking spaces and locates available parking. The user, therefore, enters the relevant street parking information for the remote street into parking assistance circular planner program 200, which then stores updated weights for the individual segment associated with the remote street. On the daily commute to work, parking assistance circular planner program 200 retrieves weight factors from local navigation database 114 and applies stored weight factors to the potential circular paths (e.g., applies weight factors to individual segments associated with the successful iteration of circular path 116 identified within local navigation database 114 with available parking). In one embodiment, the best circular path may correspond exactly to the stored iteration of circular path 116 due to the application of the stored weight factors, and parking assistance circular planner program 200 first directs the user to the last known location of parking. In another embodiment, the best circular path 116 corresponds to a revised optimal circular path 116 that utilizes different streets to return the user to the same parking location first by combining the reduced weight factors with existing navigations algorithms and traffic information.

In decision 212, parking assistance circular planner program 200 determines whether the user enters feedback through user interface 112 (e.g., street parking information, exit navigation, found parking, etc.). Street parking information includes at least two categories: strong promotion and strong penalization. Strong promotion street parking information indicates the user determines a positive assessment regarding the potential to locate parking on an individual street segment within circular path 116 (e.g., free parking, high availability, etc.). Strong penalization street parking information indicates the user determines a negative assessment regarding the potential to locate parking on an individual street segment within circular path 116 (e.g., no parking, time limit, permit only, time constraint, metered, low volume of parking spaces, seasonal, etc.). Parking assistance circular planner program 200 continues to monitor client device 110 for a user input (e.g., voice command, button selection, etc.) selecting an option to enter street parking information. Once parking assistance circular planner program 200 receives a selection to enter street parking information, parking assistance circular planner program 200 provides the user with prompts for additional information (e.g., voice commands, menu selections, etc.).

In one embodiment, parking assistance circular planner program 200 provides a list of available street information options (e.g., includes both strong promotions and strong penalizations). In another embodiment, parking assistance circular planner program 200 may provide the main two categories (e.g., strong promotion and strong penalization). In response to a selection from the user through user interface 112, parking assistance circular planner program 200 displays available options associated with the selected main category (e.g., displays only strong promotions, displays only strong penalizations). In some other embodiment, parking assistance circular planner program 200 provides a reduced list (e.g., commonly utilized, previous four entries, etc.) of strong promotions and strong penalizations (e.g., free parking, high availability, no parking, limited availability) with an option to access additional strong promotion and/or strong penalization options.

In yet another embodiment, parking assistance circular planner program 200 may additionally provide a list of conditional street information options (e.g., time constraint, limited time parking, seasonal, etc.), which the user identifies after selecting the specific conditional street information option as either a strong promotion or strong penalization and may enter additional specific constraint conditions to store for later use. For example, the user may locate a sign indicating parking is prohibited from 12 pm to 5 pm. As the current time is 7 pm, the sign does not apply, and the user selects a strong promotion instead of a strong penalization and enters the time constraints. By entering the time constraints, parking assistance circular planner program 200 saves the conditions for use later (e.g., utilizes an internal clock with the constraints to determine promotion or penalization when later revisiting the location).

If parking assistance circular planner program 200 determines the user enters feedback (decision 212, yes branch), then parking assistance circular planner program 200 updates the weight factors (step 214). If parking assistance circular planner program 200 determines the user did not enter feedback (decision 212, no branch), then parking assistance circular planner program 200 determines whether client device 110 reaches the end of the current circular path (decision 216).

In step 214, parking assistance circular planner program 200 updates the weight factors. Parking assistance circular planner program 200 accesses local navigation database 114 and updates the weight factors utilized by the GPS algorithms depending on the category (e.g., strong promotion, strong penalization) of the street information. As parking assistance circular planner program 200 receives strong promotions and strong penalizations directly from the user, parking assistance circular planner program 200 assigns greater reductions to strong promotions and greater increases to strong penalizations (user may verify and/or enter new information otherwise not known and/or available to parking assistance circular planner program 200). Parking assistance circular planner program 200 applies the appropriate weight factor (e.g., percentage, average, integer value) for the associated individual segment within circular path 116 (e.g., portion of circular path 116 associated with user input).

For example in FIG. 3A, while on circular path 302, through user interface 112, the user enters: a promotion associated with "free parking" on the street connecting D 316 and E 318, a penalization associated with "no parking anytime" on the street connecting B 312 and D 316, and no information on the streets connecting destination S 308 to A 310, A 310 to B 312, and E 318 to destination S 308 (e.g., circular path 116 is not complete, client device 110 stops at E 318). Parking assistance circular planner program 200 reduces the weight associated with the street connecting D 316 and E 318, increases the weight associated with the street connecting B 312 and D 316, and currently does not change weight factors associated with destination S 308 to A 310, A 310 to B 312, and E 318 to destination S 308 as the route is not yet complete.

In decision 216, parking assistance circular planner program 200 determines whether client device 110 reaches the end of the current circular path without finding parking (e.g., parking input may occur at any time). Parking assistance circular planner program 200 receives updates to information associated with client device 110 (e.g., location changes, distance traveled, current speed, estimated time of arrival at destination, etc.) via the GPS satellites with respect to circular path 116. At the end of circular path 116, parking assistance circular planner program 200, based on the GPS information, determines the location of client device 110 to be the same as the destination (e.g., destination S 308) associated with circular path 116 (e.g., circular path 302). Therefore, parking assistance circular planner program 200 determines client device 110 reaches the end of circular path 116. When the current location of client device 110 is not the same as destination S 308, parking assistance circular planner program 200 determines client device 110 has not reached the end of circular path 116 (e.g., GPS location corresponds to another location on circular path 116 other than the destination, estimated time of arrival is greater than zero, etc.).

If parking assistance circular planner program 200 determines client device 110 reaches the end of current circular path 116 (decision 216, yes branch), then parking assistance circular planner program 200 stores current circular path 116 in traversed circular path repository 118 (step 218). If parking assistance circular planner program 200 determines client device 110 does not reach the end of current circular path 116 (decision 216, no branch), then parking assistance circular planner program 200 continues to provide driving directions associated with current circular path 116 (step 206).

In step 218, parking assistance circular planner program 200 stores current circular path 116 in traversed circular path repository 118. Parking assistance circular planner program 200 stores the current circular path 116 with previously traversed versions of circular path 116 associated with destination S 308, which also did not result in locating parking for future use.

In step 220, parking assistance circular planner program 200 applies weight rules to current circular path 116 (e.g., penalizations to the individual street segments of current circular path 116). Parking assistance circular planner program 200 may also incorporate the individual street segments within additional circular paths that share the same individual street segments. For example, in FIG. 3A and FIG. 3B, the individual street segments connecting destination S 308 to A 310, A 310 to B 312, D 316 to E 318, and E 318 to destination S 308 are included in circular path 302 and in circular path 304 (reversed order in circular path 304). When parking assistance circular planner program 200 applies penalizations to the individual street segments within circular path 302, the penalizations associated with the individual street segments connecting destination S 308 to A 310, A310 to B 312, D 316 to E 318, and E318 to destination S 308 included within circular path 304 also update. However, the individual street segments connecting D 316 to C 314 and C 314 to B 312 within circular path 304 remain unchanged (i.e., individual street segments are not part of another circular path). In one embodiment, parking assistance circular planner program 200 applies the standard penalization to the individual street segments included within circular path 116 (e.g., parking was not located and receives no user input). For example, in FIG. 3A, parking assistance circular planner program 200 applies a standard penalization to each of the individual segments that comprise circular path 302.

In another embodiment, parking assistance circular planner program 200 applies an additional standard penalization on top of existing strong promotions and strong penalizations previously entered by the user (step 214). For example, in FIG. 3A, the individual segment between D 316 and E 318 includes a strong promotion for free parking, and the individual segment between B 312 and D 316 includes a strong penalization for no parking anytime. In addition to the standard penalizations parking assistance circular planner program 200 applies to all of the individual segments of circular path 302, parking assistance circular planner program 200 also applies the strong promotion and strong penalization associated with the two identified segments (e.g., reduces the amount of the strong promotion associated with the individual segment between D 316 and E 318 and creates a greater penalization associated with the segment between B 312 and D 316). Parking assistance circular planner program 200 also updates the overall value of circular path 304 which includes individual segments between destination S 308 to A 310, A 310 to B312, D 316 and E 318, and E 318 to destination S 308.

In some other embodiment, parking assistance circular planner program 200 compounds multiple standard penalizations when circular path 116 is not new (e.g., adds additional penalizations to existing standard and/or strong promotions and/or penalizations). For example, a user did not find parking while traveling on circular path 302 depicted in FIG. 3A or circular path 304 depicted in FIG. 3B, but even with applied weight penalizations, parking assistance circular planner program 200 reselects circular path 302 over circular path 306 for the next circular path 116. Parking assistance circular planner program 200, therefore, adds an additional standard penalization thereby compounding the penalizations and partially negating existing promotions for both circular path 302 and circular path 304. The ranking of circular path 302 and circular path 304 may then drop to a lower position (e.g., no longer occupy the top ranking positions), and thus allows parking assistance circular planner program 200 to then select circular path 306 as depicted in FIG. 3C.

In step 222, parking assistance circular planner program 200 recalculates circular paths and determines a suggested circular path. Parking assistance circular planner program 200 accesses local navigation database 114 and additionally applies the updated weight factors, thus incorporating promotions and penalizations to the existing navigation system route planning algorithms to create multiple potential circular paths. Parking assistance circular planner program 200 may also incorporate additional promotions and penalizations based on information from a traffic monitoring system into the existing navigation algorithms. For example, rush hour traffic results in congestion and travel time on circular path 116 increases, therefore, parking assistance circular planner program 200 applies an additional penalization increasing the weight for the individual segment associated with the traffic slow down. However, an alternate side street indicates increased speed (e.g., a faster travel time), and parking assistance circular planner program 200 applies an additional promotion. Another side street shows a steady flow of traffic, the travel time is constant, and parking assistance circular planner program 200 does not apply either a promotion or penalization.

Based on the recalculated values, parking assistance circular planner program 200 organizes the circular paths in an ordered ranking (e.g., ranked highest to lowest, with highest being the first suggested circular path followed by the second suggested circular path, etc.). Parking assistance circular planner program 200 then selects the first of the suggested circular paths in the ordered ranking as a suggested iteration of circular path 116. For example, in FIG. 3A, circular path 302 did not result in parking, and after application of the standard penalization, strong promotion (e.g., free parking), and strong penalization (no parking anytime), parking assistance circular planner program 200 now selects circular path 304 as depicted in FIG. 3B. Additionally, parking assistance circular planner program 200 may reverse the driving directions due to the strong promotion (revisits individual segments between E 318 and D 316 earlier) as depicted by the dashed line and counter clockwise arrows.

In decision 224, parking assistance circular planner program 200 determines whether suggested circular path 116 exceeds the maximum value. In one embodiment, maximum values are predefined by parking assistance circular planner program 200. In another embodiment, parking assistance circular planner program 200 receives maximum values from the user through user interface 112 at initiation. Maximum values may be identified for multiple criteria, such as a maximum radius for the destination (e.g., half mile), maximum travel time (e.g., fifteen minutes), and maximum penalization (e.g., four times the original weight). In one embodiment, parking assistance circular planner program 200 includes a single maximum value condition (e.g., maximum penalization). In another embodiment, parking assistance circular planner program 200 includes multiple maximum value conditions (e.g., distance, time, or penalization). Parking assistance circular planner program 200 compares the calculated values (e.g., distance, time) and/or stored weight factors (e.g., penalizations) associated with suggested circular path 116 to the predefined maximum values and determines whether the maximum value has been met and/or exceeded.

If parking assistance circular planner program 200 determines suggested circular path 116 exceeds the maximum value (decision 224, yes branch), then parking assistance circular planner program 200 resets the weight factors and clears traversed circular path repository 118 (step 226). If parking assistance circular planner program 200 determines suggested circular path 116 does not exceed the maximum value (decision 224, no branch), then parking assistance circular planner program 200 determines whether suggested circular path 116 is new (decision 228).

In step 226, parking assistance circular planner program 200 resets the weight factors and clears traversed circular path repository 118. In one embodiment, parking assistance circular planner program 200 resets the weight factors associated with the individual segments of circular path 116 to the original settings (e.g., removes promotions and penalizations) within local navigation database 114. In another embodiment, parking assistance circular planner program 200 resets the weight factors but maintains strong promotions and strong penalizations regarding user input street parking information (e.g., only removes standard penalizations and promotions). Parking assistance circular planner program 200 removes previous stored versions of circular paths from traversed circular path repository 118. By removing the previous stored versions of circular paths from traversed circular path repository 118, in subsequent iterations, parking assistance circular planner program 200 identifies circular path 116 as a new circular path available for selection for a user to traverse again.

In decision 228, parking assistance circular planner program 200 determines whether the suggested circular path is new. Parking assistance circular planner program 200 searches the stored circular paths within traversed circular path repository 118 for a match with the suggested circular path with (e.g., identical individual street segments with identical destination). If parking assistance circular planner program 200 determines the suggested circular path is new (decision 228, yes branch), then parking assistance circular planner program 200 updates the suggested circular path to be the current circular path (step 230). If parking assistance circular planner program 200 determines suggested circular path 116 is not new (decision 228, no branch), then parking assistance circular planner program 200 applies weight rules to current circular path 116 (step 220).

In step 230, parking assistance circular planner program 200 updates the suggested circular path to be the current circular path (e.g., circular path 116). Parking assistance circular planner program 200 then provides driving directions associated with current circular path 116 (step 206).

Figure 4:
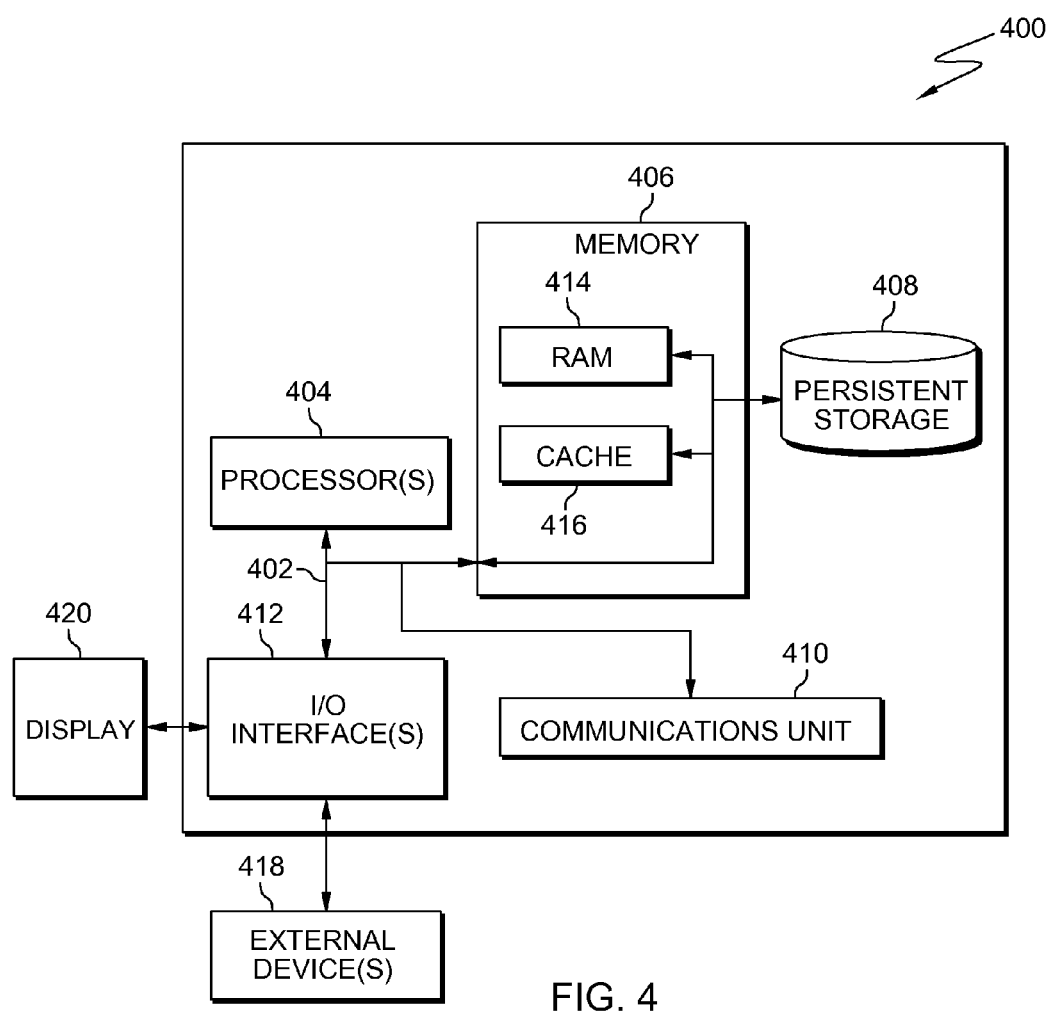
FIG. 4 is a block diagram of components of the client device executing the parking assistance circular planner program, in accordance with an embodiment of the present invention.

FIG. 4 depicts a block diagram of components of navigation system environment 400, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Navigation system environment 400 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM) 414 and cache memory 416. In general, memory 406 can include any suitable volatile or non-volatile computer readable storage media.

User interface 112, local navigation database 114, circular path 116, traversed circular path repository 118, navigation database 122, and parking assistance circular planner program 200 are stored in persistent storage 408 for execution and/or access by one or more of the respective computer processor(s) 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, a read-only memory (ROM), an erasable programmable read-only memory (EPROM), a flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices, including resources of enterprise grid and client devices. In these examples, communications unit 410 includes one or more network interface cards. Communications unit 410 may provide communications through the use of either or both physical and wireless communications links. User interface 112, local navigation database 114, circular path 116, traversed circular path repository 118, navigation database 122, and parking assistance circular planner program 200 may be downloaded to persistent storage 408 through communications unit 410.

I/O interface(s) 412 allows for input and output of data with other devices that may be connected to navigation system environment 400. For example, I/O interface(s) 412 may provide a connection to external device(s) 418, such as a keyboard, a keypad, a touch screen, and/or some other suitable input device. External device(s) 418 can also include portable computer readable storage media such as, for example, thumb drives, portable optical or magnetic disks, and memory cards. Software and data used to practice embodiments of the present invention, e.g., user interface 112, local navigation database 114, circular path 116, traversed circular path repository 118, navigation database 122, and parking assistance circular planner program 200, can be stored on such portable computer readable storage media and can be loaded onto persistent storage 408 via I/O interface(s) 412. I/O interface(s) 412 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:
1. A method for locating parking, the method comprising:
   determining, by one or more computer processors, driving directions to a destination based at least in part on a global positioning system;

receiving, by one or more computer processors, a navigation input from a user to locate parking associated with the destination;

calculating, by one or more computer processors:

one or more navigation paths based on the destination that connect and return to the destination, wherein the destination is an identical starting and ending point for each one of the one or more navigational paths, and wherein the one or more navigation paths include at least two street segments; and overall values of the one or more navigation paths that indicate priority based on one or more weight factors associated with the at least two street segments, wherein an individual weight factor within the one or more weight factors is associated with each individual street segment within the at least two street segments;

determining, by one or more computer processors, an ordered ranking of the one or more navigation paths based on the overall values of the one or more navigation paths;

selecting, by one or more computer processors, a first navigation path from the calculated one or more navigation paths utilizing the ordered ranking of the one or more navigation paths;

providing, by one or more computer processors, driving directions associated with the first navigation path;

determining, by one or more computer processors, the user does not provide an input indicating an available parking location while utilizing the first navigation path;

determining, by one or more computer processors, whether the first navigation path is complete;

responsive to determining the navigation path is complete, storing the first navigation path in memory;

selecting, by one or more computer processors, a second navigation path from the one or more navigation paths based on a second ordered ranking; and providing, by one or more computer processors, driving directions associated with the second navigation path.

2. The method of claim 1, further comprising:

receiving, by one or more computer processors, one or more user inputs associated with the first navigation path;

identifying, by one or more computer processors, a street segment within the first navigation path corresponding to the received one or more user inputs;

updating, by one or more computer processors, the one or more weight factors associated with the identified street segment based on the received one or more user inputs; and storing, by one or more computer processors, the updated one or more weight factors associated with the identified street segment in memory.

3. The method of claim 2, wherein receiving the one or more user inputs associated with the first navigation path further comprises one or more of:

receiving, by one or more computer processors, user input of a strong promotion to modify the one or more weight factors associated with the street segment of the first navigation path as a reduction to the one or more weight factors;

receiving, by one or more computer processors, user input of a strong penalization to modify the one or more weight factors associated with the street segment of the first navigation path as an increase to the one or more weight factors; and receiving, by one or more computer processors, user input of a conditional street information that includes a constraint, to modify the one or more weight factors associated with the street segment of the first navigation path based on a determination of the constraint associated with the conditional street information that corresponds to one of the following: the strong promotion and the strong penalization.

4. The method of claim 1, wherein determining whether the user locates parking while utilizing the first navigation path further comprises:

determining, by one or more computer processors, the user provides input indicating an available parking location associated with the first navigation path;

identifying, by one or more computer processors, a street segment corresponding to the determined input indicating the available parking location within the first navigation path;

modifying, by one or more computer processors, the one or more weight factors associated with the identified street segment based on a promotion; and storing, by one or more computer processors, the modified one or more weight factors associated with the identified street segment and the first navigation path in memory.

5. The method of claim 1, wherein selecting the second navigation path from the one or more navigation paths based on the second ordered ranking further comprises:

updating, by one or more computer processors the one or more stored weight factors associated with one or more identified street segments of the first navigation path, by applying a first penalization;

recalculating, by one or more computer processors, overall values of the one or more navigation paths that include at least one of the at least two street segments of the first navigation path based on the updated one or more stored weight factors; and determining, by one or more computer processors, the second ordered ranking of the one or more navigation paths based on the recalculated overall values, wherein the second ordered ranking includes the first navigation path.

6. The method of claim 5, further comprising:

determining, by one or more computer processors, whether a recalculated overall value associated with the second navigation path exceeds a maximum value;

responsive to determining the recalculated overall value associated with the second navigation path does not exceed the maximum value, determining, by one or more computer processors, whether the second navigation path is new;

responsive to determining the second navigation path is not new, modifying, by one or more computer processors, the updated one or more stored weight factors associated with the second navigation path by adding a second penalization to the updated one or more stored weight factors associated with the one or more street segments of the second navigation path; and recalculating, by one or more computer processors, the recalculated overall values of the one or more navigation paths based on the updated one or more stored weight factors.

7. A computer program product for locating parking, the computer program product comprising:

one or more computer readable storage media and program instructions stored on the one or more computer readable storage media, the program instructions comprising:

program instructions to determine driving directions to a destination based at least in part on a global positioning system;

program instructions to receive a navigation input from a user to locate parking associated with the destination;

program instructions to calculate:
  one or more navigation paths based on the destination that connect and return to the destination, wherein the destination is an identical starting and ending point for each one of the one or more navigational paths, and wherein the one or more navigation paths include at least two street segments; and
  overall values of the one or more navigation paths that indicate priority based on one or more weight factors associated with the at least two street segments, wherein an individual weight factor within the one or more weight factors is associated with each individual street segment within the at least two street segments;

program instructions to determine an ordered ranking of the one or more navigation paths based on the overall values of the one or more navigation paths;

program instructions to select a first navigation path from the calculated one or more navigation paths utilizing the ordered ranking of the one or more navigation paths;

program instructions to provide driving directions associated with the first navigation path;

determine the user does not provide an input indicating an available parking location while utilizing the first navigation path;

determine whether the first navigation path is complete;

responsive to determining the navigation path is complete, store the first navigation path in memory;

select a second navigation path from the one or more navigation paths based on a second ordered ranking; and provide driving directions associated with the second navigation path.

8. The computer program product of claim 7, further comprising program instructions, stored on the one or more computer readable storage media, to:
  receive one or more user inputs associated with the first navigation path;
  identify a street segment within the first navigation path corresponding to the received one or more user inputs;
  update the one or more weight factors associated with the identified street segment based on the received one or more user inputs; and
  store the updated one or more weight factors associated with the identified street segment in memory.

9. The computer program product of claim 8, wherein receiving the one or more user inputs associated with the first navigation path further comprises one or more of program instructions, stored on the one or more computer readable storage media, to:
  receive user input of a strong promotion to modify the one or more weight factors associated with the street segment of the first navigation path as a reduction to the one of more weight factors;
  receive user input of a strong penalization to modify the one or more weight factors associated with the street segment of the first navigation path as an increase to the one of more weight factors; and
  receive user input of a conditional street information that includes a constraint, to modify the one or more weight factors associated with the street segment of the first navigation path based on a determination of the constraint associated with the conditional street information that corresponds to one of the following: the strong promotion and the strong penalization.

10. The computer program product of claim 7, wherein determining whether the user locates parking while utilizing the first navigation path further comprises program instructions, stored on the one or more computer readable storage media, to:
  determine the user provides input indicating an available parking location associated with the first navigation path;
  identify a street segment corresponding to the determined input indicating the available parking location within the first navigation path;
  modify the one or more weight factors associated with the identified street segment based on a promotion; and
  storing the modified one or more weight factors associated with the identified street segment and the first navigation path in memory.

11. The computer program product of claim 7, wherein selecting the second navigation path from the one or more navigation paths based on the second ordered ranking further comprises program instructions, stored on the one or more computer readable storage media, to:
  update the one or more stored weight factors associated with one or more identified street segments of the first navigation path, by applying a first penalization;
  recalculate overall values of the one or more navigation paths that include at least one of the at least two street segments of the first navigation path based on the updated one or more stored weight factors; and
  determine the second ordered ranking of the one or more navigation paths based on the recalculated overall values, wherein the second ordered ranking includes the first navigation path.

12. The computer program product of claim 11, further comprising program instructions, stored on the one or more computer readable storage media, to:
  determine whether a recalculated overall value associated with the second navigation path exceeds a maximum value;
  responsive to determining the recalculated overall value associated with the second navigation path does not exceed the maximum value, determine whether the second navigation path is new;
  responsive to determining the second navigation path is not new, modify the updated one or more stored weight factors associated with the second navigation path by adding a second penalization to the updated one or more stored weight factors associated with the one or more street segments of the second navigation path; and
  recalculate the recalculated overall values of the one or more navigation paths based on the updated one or more one or more stored weight factors.

13. A computer system for locating parking, the computer system comprising:
  one or more computer processors, one or more computer readable storage media, and program instructions stored on the computer readable storage media for execution by at least one of the one or more processors, the program instructions comprising:

program instructions to determine driving directions to a destination based at least in part on a global positioning system;

program instructions to receive a navigation input from a user to locate parking associated with the destination;

program instructions to calculate:
  one or more navigation paths based on the destination that connect and return to the destination, wherein the destination is an identical starting and ending point for each one of the one or more navigational paths, and wherein the one or more navigation paths include at least two street segments; and
  overall values of the one or more navigation paths that indicate priority based on one or more weight factors associated with the at least two street segments, wherein an individual weight factor within the one or more weight factors is associated with each individual street segment within the at least two street segments;

program instructions to determine an ordered ranking of the one or more navigation paths based on the overall values of the one or more navigation paths;

program instructions to select a first navigation path from the calculated one or more navigation paths utilizing the ordered ranking of the one or more navigation paths;

program instructions to provide driving directions associated with the first navigation path;

program instructions to determine the user does not provide an input indicating an available parking location while utilizing the first navigation path;

determine whether the first navigation path is complete;

responsive to determining the navigation path is complete, store the first navigation path in memory;

select a second navigation path from the one or more navigation paths based on a second ordered ranking; and provide driving directions associated with the second navigation path.

14. The computer system of claim 13, further comprising program instructions, stored on the one or more computer readable storage media, to:
  receive one or more user inputs associated with the first navigation path;
  identify a street segment within the first navigation path corresponding to the received one or more user inputs;
  update the one or more weight factors associated with the identified street segment based on the received one or more user inputs; and
  store the updated one or more weight factors associated with the identified street segment in memory.

15. The computer system of claim 14, wherein receiving the one or more user inputs associated with the first navigation path further comprises one or more of program instructions, stored on the one or more computer readable storage media, to:
  receive user input of a strong promotion to modify the one or more weight factors associated with the street segment of the first navigation path as a reduction to the one of more weight factors;
  receive user input of a strong penalization to modify the one or more weight factors associated with the street segment of the first navigation path as an increase to the one of more weight factors; and
  receive user input of a conditional street information that includes a constraint, to modify the one or more weight factors associated with the street segment of the first navigation path based on a determination of the constraint associated with the conditional street information that corresponds to one of the following: the strong promotion and the strong penalization.

16. The computer system of claim 13, wherein determining whether the user locates parking while utilizing the first navigation path further comprises program instructions, stored on the one or more computer readable storage media, to:
  determine the user provides input indicating an available parking location associated with the first navigation path;
  identify a street segment corresponding to the determined input indicating the available parking location within the first navigation path;
  modify the one or more weight factors associated with the identified street segment based on a promotion; and
  storing the modified one or more weight factors associated with the identified street segment and the first navigation path in memory.

17. The computer system of claim 13, wherein selecting the second navigation path from the one or more navigation paths based on the second ordered ranking further comprises program instructions, stored on the one or more computer readable storage media, to:
  update the one or more stored weight factors associated with one or more identified street segments of the first navigation path, by applying a first penalization;
  recalculate overall values of the one or more navigation paths that include at least one of the at least two street segments of the first navigation path based on the updated one or more stored weight factors; and
  determine the second ordered ranking of the one or more navigation paths based on the recalculated overall values, wherein the second ordered ranking includes the first navigation path.

* * * * *